Fig. 1

INVENTOR.
GORDON H. JONES
BY
Wolfe, Hubbard, Voit & Osann
ATTYS

June 6, 1967

G. H. JONES 3,324,365

METHOD AND APPARATUS FOR PRODUCING A SERVO
POSITIONING SYSTEM COMPENSATING CAM

Filed Dec. 9, 1963

INVENTOR.
GORDON H. JONES by: Wolfe, Hubbard, Voit & Osann
ATT'YS.

United States Patent Office 3,324,365
Patented June 6, 1967

3,324,365
METHOD AND APPARATUS FOR PRODUCING A SERVO POSITIONING SYSTEM COMPENSATING CAM
Gordon H. Jones, Fond du Lac, Wis., assignor to Gidding & Lewis Machine Tool Company, Fond du Lac, Wis., a corporation of Wisconsin
Filed Dec. 9, 1963, Ser. No. 328,905
14 Claims. (Cl. 318—28)

The present invention relates to servo control systems, particularly means for compensating for recurring errors of lead in drive screws of such systems.

While most sources of error in positioning drives of servo controls may be reduced or eliminated, there still remains the problem that recurring errors of lead in drive screws will produce positioning inaccuracies. Such recurring errors may be reduced by manufacturing the lead screws to more precise dimensions, but holding to closer tolerances than is practical in production manufacture results in significantly higher costs. Moreover, even where a long screw is manufactured to the required tolerances, it may lose its accuracy before assembly in the positioning system due to handling or due to metallurgical and mechanical changes in the screw itself. Cam compensation for lead screw error is a known approach to solving the problem of recurring errors, which involves constructing a cam that represents the recurring lead screw errors and employing the cam to introduce compensating motion into the positioning drive train.

The main object of the present invention is to provide cam compensated servo control systems particularly suited to massive machine tools having long travelling components, so that it becomes feasible to use lead screws, particularly long lead screws, manufactured to reasonable production tolerances and yet obtain high positioning accuracy of machine tool components with the servo controls.

A related object is to provide a method for producing a cam usable for subsequent compensation of a servo positioning system by means of the cam, which method involves forming the cam to incorporate or record compensation errors accounting for inaccuracies in the servo positioning system while that system is being compensated by means other than the cam for such inaccuracies.

Another object of the invention is to provide cam compensated servo control systems for machine tools which may be installed after machine tools are assembled at their site, so that the servo control systems will be compensated for errors in the lead screws that develop between manufacture of the machine tools by the manufacturer and reassembly for the customer.

A further object is to provide servo controls having cam compensation which accounts for back-lash upon reversal of the positioning drives.

Another object is to enhance the accuracy and stability of servo control systems by removing the main drive, gearing, back-lash and spring-mass resonances from the positioning servo loop and utilizing cam controlled mechanical introduction of compensating motion for correcting recurring lead screw errors.

Another object is to provide cam compensation for servo control systems, which is effective to achieve high positioning accuracies with production manufactured lead screws and which may be manufactured and installed at great savings in cost.

Other objects of the invention will be apparent from the following description taken in connection with the drawings wherein.

While the invention is susceptible of various modifications and alternative constructions, a preferred embodiment is shown in the drawings and will be described below in considerable detail. It will be understood that there is no intention to limit the invention to the specific form disclosed, but on the contrary, the intention is to cover all modifications, alternative constructions, and equivalents falling within the spirit and scope of the appended claims.

Figure 1:
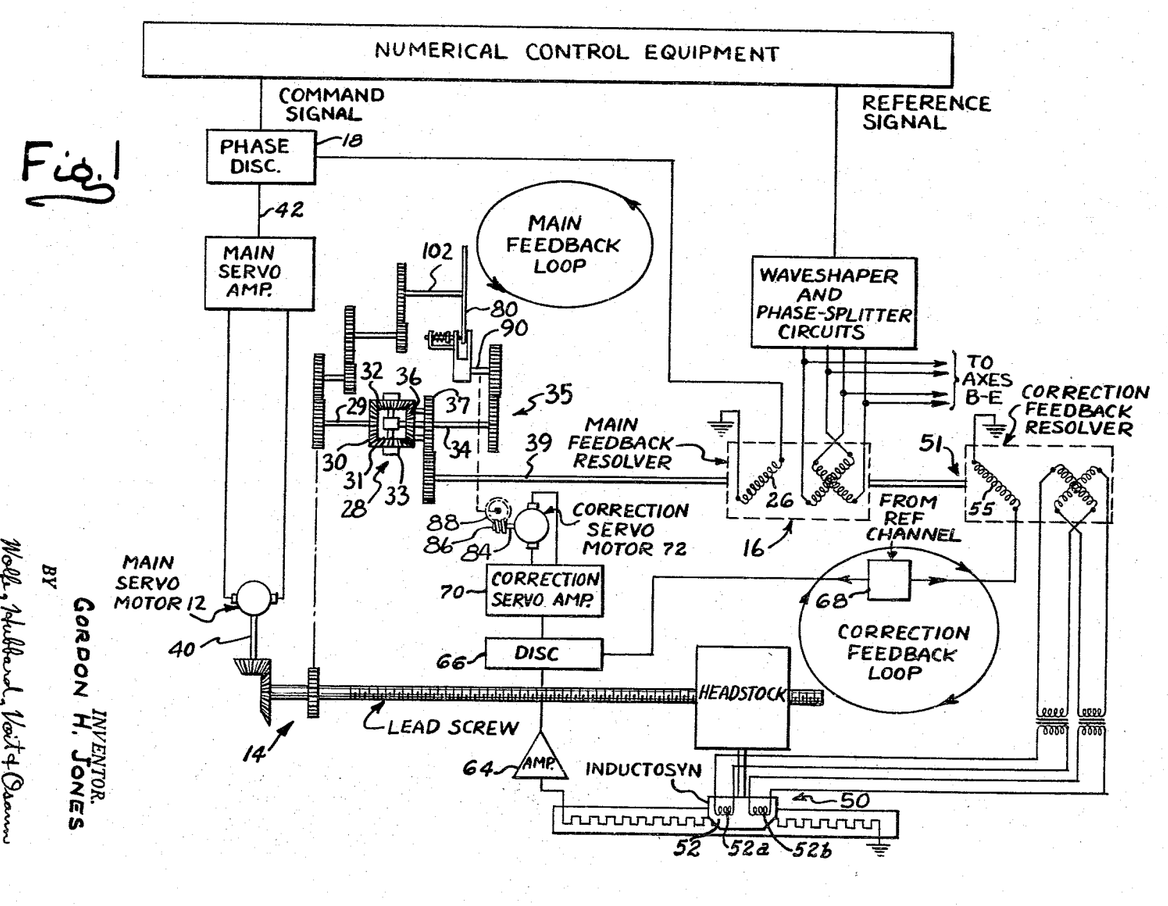
FIGURE 1 is a schematic diagram illustrating a servo control system compensated for feed drive errors by means of a correction feedback loop, and having a scriber system for recording lead screw error.
Figure 4:
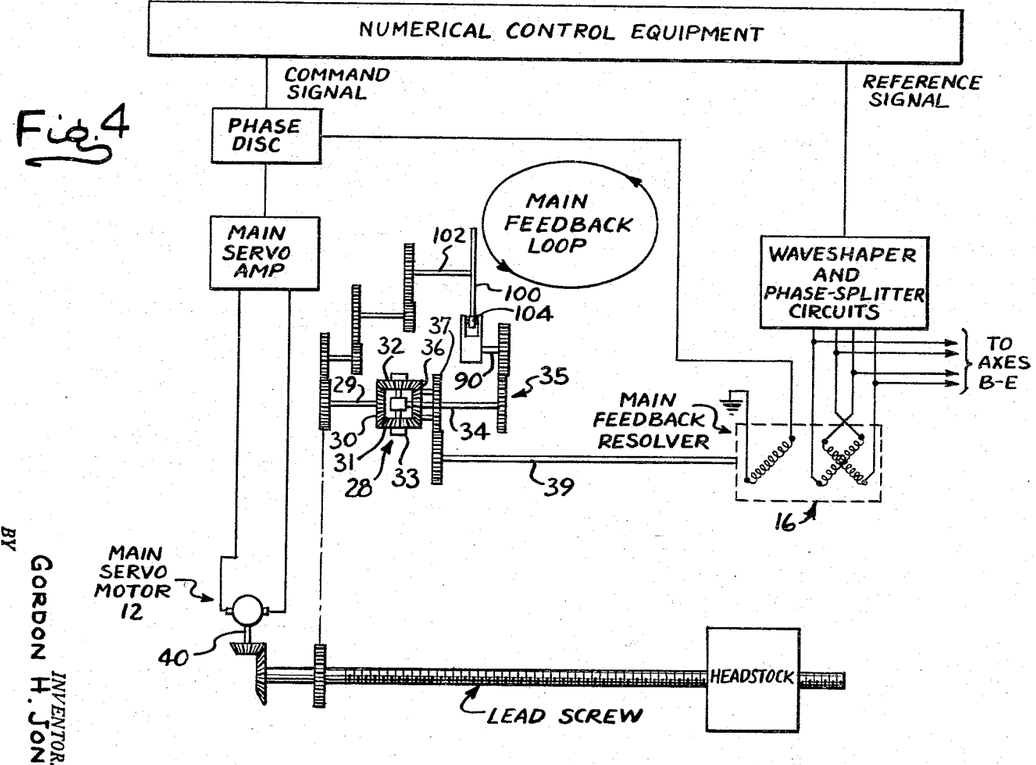
FIG. 4 is a schematic diagram illustrating the servo control system of FIGURE 1 with the correction feedback loop and the scriber system removed, and cam compensation incorporated therein.

Referring now to FIGS. 1 and 4, the invention while generally applicable to servo control systems is, for exemplary purposes, illustrated in connection with a numerically controlled path system of machine tool control. In one of its principal aspects, this invention provides a method for producing a compensation cam representing lead screw errors, and also provides a servo control compensated by means including the cam for such errors.

While the invention has been shown in connection with correcting for lead errors in feed screws, it is equally applicable to other types of feed drives using members such as racks, for correcting for rack pitch or lead errors. Thus, where the expressions "feed screw," "screw," or "feed means" are used herein, they shall be construed to include equivalent feed members such as racks or screws.

FIGURE 1 schematically depicts a servo control incorporating a separable electrical correction means for generating a lead screw error signal which via a correction feedback loop is used to correct for such errors. According to the present invention, this lead screw error signal is recorded directly on a cam blank as one step in a process to produce a cam which is used in a mechanical drive compensation mechanism as a substitute for the electrical correction means.

Referring, therefore to FIG. 4, this figure schematically depicts the same servo control shown in FIG. 1 with the electrical correction means and cam recording means replaced by the cam compensation mechanism.

One of the main features of the invention is that it affords means including precision electrical measuring devices for generating and recording lead screw error signals, thus facilitating construction of an accurate cam for use in cam compensation. Moreover, the cam may be produced after the machine tool is installed at its site in the customer's plant so that the cam accurately reflects errors in the lead screw that may have arisen through handling, or while transporting the lead screw to the site for assembly with the machine tool. The invention further provides the feature that the precision error signal generating means and mechanism for recording the error signal are replaced with a mechanical cam compensation system. The mechanical system is more rugged and durable than the electrical elements including the measuring devices of the generating and recording means which it replaces. Moreover, the cam compensation mechanism may be easily mounted on the machine tool, guarded against damage, and maintained in highly efficient working order considerably more readily than the precision electrical devices which it replaces.

Turning now to FIG. 1, this figure schematically depicts a servo control having an electrical correction system accounting and correcting for lead screw errors. This system is described in detail in my prior filed copending application Ser. No. 251,371, entitled, Method and Apparatus for Compensating Machine Feed Drive Servomechanisms. In carrying out the present invention, as shown in FIG. 1, the precision measuring and signal generating means of the correction system is utilized as a source of an accurate representation of the recurring lead screw errors in the production of a cam. Still referring to FIG. 1 for a short description of the main servo control, it will be seen that the control is operated from the block indicated at the top of FIGURE 1 as "numerical control equipment" which provides command and reference signals to the control. The system is shown connected to a lead screw for positioning a movable element such as a headstock along a machine tool rail.

While only a single axis control channel is shown in FIGURE 1, it is contemplated similar control channels will be provided for one or more machine elements along one or more other control axes. Thus, the numerical control equipment may include a recorded magnetic tape played back by means of magnetic play back heads which reproduce reference and command signals previously recorded on the tape. It will be understood, however, that the specifics of the numerical control equipment are not part of the present invention and that the present system is applicable where different types of control equipment are used as will be apparent as the description proceeds.

In brief, the servo control includes the servomotor 12 which through a feed drive 14 positions the movable member along its axis of motion. A main feedback transducer 16, herein shown as a rotary resolver or synchro, produces a signal representing the headstock position which is conveyed via the main feedback loop to a means 18 for comparing the phase of the feedback and command signals to produce an error signal for driving the servomotor 12. This system typically employs a phase-matching approach; that is, when there is no longer any phase difference between the command and feedback signals, the servomotor 12 stops with the headstock at the command position. Applied to path control, the movable element tracks the command signal.

As shown schematically by FIGURE 1, the resolver rotor 26 is mechanically connected by means herein shown as a differential gear 28 and the feed drive 14 to be rotated as the controlled machine element, herein the machine tool headstock, moves. The differential gearing 28 is arranged with the drive from the main servomotor 12 through the shaft 29 into the differential drive gear 30. Differential gears 31, 32 in mesh with the drive gear are carried by a spider 33 fixed to the input shaft 34 which is coupled through gears 35 to the correction servomotor 70. The arrangement is such that in the absence of rotation of the input shaft 34 and spider 33 to introduce compensating motion into the drive train to the resolver rotor 26, the output differential gear 36 is driven to rotate the output gear 37 and the shaft 39 extending to the rotor 26 of the main feedback resolver. Thus, the feedback resolver rotor 26 is rotated as the lead screw rotates to move the headstock. The phase of the signal induced in the main feedback resolver winding 26 accurately represents by a factor the angular position of the shaft 40 at the input to the feed drive, although it will be understood that because of the arrangement of the gearing, the phase of the signal will change 360° for a specific amount of headstock movement; for example, for each tenth of an inch of movement, the rotor 26 will make one complete revolution. The main feedback resolver signal also represents the position of the headstock with whatever positioning inaccuracies are present in the feed drive (ignoring the correction servomotor operation). The signal induced in the main feedback resolver rotor 26 is supplied to a phase discriminator 18 which receives as its other input a command signal herein shown as a phase modulated square wave. The phase modulated command square wave signals received from the numerical control equipment represent by their phase shift the position desired along the rail for the machine tool headstock.

The phase discriminator 18 thus receives two alternating input signals and in a manner well known to those skilled in the art provides a D.C. error signal on its output line 42 proportional in magnitude to the amount of phase difference between the two input signals and which is of a polarity corresponding to the sense of the phase difference. Thus, if the phase of the two input signals exactly agrees, there will be no error voltage appearing on the output line.

The error voltage appearing on the output line 42 is supplied through a suitable amplifier 44 to the reversible servomotor 12 for positioning the headstock. As here shown, the servomotor 12 drives through the feed drive 14 which includes the lead screw for moving the headstock back and forth along the rail. The servomotor 12 is here shown as a fast-response variable-speed D.C. motor which runs in one direction or the other according to the polarity of the error signal appearing on the input line and which runs at a speed proportional to the magnitude of that error signal. In this manner, as the phase of the command signal supplied to the phase discriminator 18 progressively shifts relative to the phase of the reference signal from the numerical control equipment, the phase discriminator 18 will provide an error voltage which properly energizes the servomotor 12 to cause the headstock and the coupled resolver 16 to execute the motions previously represented by numerical information put onto a magnetic tape of the numerical control equipment or some other record storage means.

In order to accurately position a movable machine element, the headstock movable along the rail, for example, it is absolutely essential to reduce the inaccuracies in the feed drive to as low a point as possible. Even after making the drive as stiff as possible by reducing back-lash and deflections to the extent feasible following the most advanced machining and servomechanism practices, it has been found that there are variable factors that introduce substantial inaccuracies in the positioning which may be achieved by use of the servomechanism control system which has just been described. Such variable factors include lead screw errors and back-lash errors.

Compensation for such errors may be advantageously achieved, as described in my copending application Ser. No. 251,371, filed Jan. 14, 1963, and entitled, Method and Apparatus for Compensating Machine Feed Drive Servomechanisms, by means of a correction feedback loop which is shown incorporated in the servo control of FIG. 1. This correction feedback loop includes electrical devices providing a signal representing the differential between indicated position and actual position of the machine tool component. According to the invention of said application, this signal is employed via a correction servomotor 72 to introduce compensating motion into the connection to the main feedback resolver 16 so that the latter is compensated for such differential.

Referring again to FIG. 1 for a description of how this is achieved, a transducer 50 is located dynamically spaced from the main feedback transducer 16 and as close as possible to the machine element being positioned so as to provide a highly accurate representation of actual position of the machine headstock. For such purposes, a conventional position measuring transformer may be used. Such a transformer includes inductively coupled members in the form of a slider 52 and a scale 54 movable with respect to each other. The slider 52 fastened to the headstock has two windings 52a, 52b representing the stator of the device, such windings being in space quadrature; i.e., 90° apart where 360°=0.1 inch linear separation; the scale 54 is in the form of a winding fixed to the rail representing the rotor of the device, and having a cycle of 0.1 inch. With the slider windings 52a, 52b excited by an input from a resolver connected to the feed drive in the form of voltages in the ratio of the sine and cosine of the angle representing indicated position of the machine headstock, the scale 54 will provide an output signal which is substantially an amplitude-modulated, phase-reversable sinusoidal wave representing, by the amplitude and phase of the wave, the magnitude and direction, respectively, of the error between the actual position of the headstock as sensed by the transducer 50, and the indicated position of the headstock as sensed by the resolver supplying the input voltages. In the present illustration, to completely separate the correction feedback loop from the main feedback loop, an additional correction resolver 51 is used to produce the input voltages for the transducer 50. However, the rotor 55 of the correction resolver 51 is mechanically driven from the feed drive to rotate one revolution corresponding to 0.1 inch of linear motion of the headstock and slider 52, so that the windings 56a, 56b produce the requisite input voltages.

Accordingly, the output of the scale 54 when discriminated against a reference voltage produces a signal constituting a measure of the difference between resolver 51 motion and motion of the transducer 50. Whenever such a "difference" is present, it represents inaccuracies resulting from back-lash, deflections, etc. in the feed drive 14. Accordingly, this "difference" as represented by the output of the scale 54 is fed back via the correction feedback loop to compensate the main feedback loop.

Describing the correction feedback loop circuit in somewhat more detail, the rotor 55 of the correction resolver 51 is excited with a sinusoidal voltage which is here shown as derived from a separate single-phase oscillator 68, in order to retain the advantages of separation between the correction loop and the main feedback loop. Thus, as the rotor 55 of the correction resolver 51 turns as the headstock is moved by the servomotor 12, sine and cosine voltages are induced in the quadrature windings 56a, 56b of the correction resolver 51, which sine and cosine voltages represent the angular position of the rotor 55 and are conveyed to the linear resolver 50 located at the machine tool rail. In the present case, ignoring for the moment any correction introduced by the correction servomotor, the rotor 55 represents the angular position of the servomotor 12 and of the gearing at the drive end of the feed drive 14 coupled to the movable machine tool element, herein the headstock. The slider 52, it will be noted is fixed to the headstock and thus the slider is operable to accurately represent the position of the headstock. With the slider 52 excited from the stator windings of the correction resolver 51, the output from the scale 54 of the transducer 50 is in the form of a sinusoidal signal the amplitude of which is a function of the difference in position between the correction rotary resolver rotor 55 and the linear transducer slider 52, which difference is attributable to lead errors in the feed drive, and the phase of which represents the direction of this difference in position. This output signal from the linear transducer scale 54 is supplied through an amplifier 64 to a discriminator 66. This discriminator 66 is supplied on its other input with a signal from the single-phase oscillator 68 which is identical in phase to the signal supplied to correction resolver rotor winding 55. The discriminator 66 of the correction feedback loop is operable, in a manner well known to those skilled in the art, to produce a D.C. signal the sense and magnitude of which represents the difference between actual and indicated position of the headstock which in turn is fed to an amplifier 70 of the correction feedback loop and a correction servomotor 72 which is driven in one direction or the other according to the sense of the signal, tending to correct and align the position of the correction resolver rotor 55 with the actual position of the headstock as indicated by the slider 52. To this end, the correction servomotor 72 is connected to the differential gear 28 between the main servomotor 12 and the shafts 39, 39a connecting the main feedback resolver 16 and the correction feedback resolver 51 such that the correction servomotor corrects the shaft input to the main and correction resolvers. The correction servomotor 72 will be driven in a direction tending to reduce to zero the difference signal from the discriminator 66. The correction servomotor 72 through the shaft 34 and differential gears 31, 32, 36 is effective to adjust the shaft input to the main feedback resolver 16 since the rotors 26, 55 of both resolvers 16, 51 are coupled together. In this way, the rotor 26 of the main feedback resolver is rotated to a position accurately representing the actual position of the headstock, and the feedback to the path control system, that is, the main feedback loop, thus supplies a signal to the discriminator 18 of the path control which accounts for the inaccuracies of the feed drive 14. The headstock will be accurately moved through the motion called for by the command signal.

In the foregoing description of the operation of the correction feedback loop, it was mentioned that the correction servomotor 72 introduces compensating motion into the drive for the main feedback resolver by means of the differential gear 28. It will be clear that the correction servomotor through this means adjusts the shaft 39 of the main feedback resolver such that the latter then reflects actual rather than indicated headstock position. To this end, the correction servomotor rotates its shaft 84 so that at any given point along the feed screw the position of this shaft 84 represents the compensating adjustment to correct for lead screw error at that point. If it is assumed that the headstock is initially positioned at the left-hand end of its travel (as viewed in FIG. 1) and is traversed its full travel along the rail from left to right, the correction servomotor 72 will operate to introduce the requisite compensating motion as the headstock traverses.

Accordingly, in carrying out the method of this invention, a record is made of the required compensating motion of the correction servomotor for movement in one direction for the full length travel of the headstock. This record is then used to produce a compensating cam. Once the cam is available, the correction feedback loop, shown in FIG. 1, including its measuring and indicating devices and instrumentalities, is removed from the system and replaced by the cam and associated mechanical means for introducing compensating motion into the main feedback resolver drive for corresponding movement of the headstock.

Figure 2:
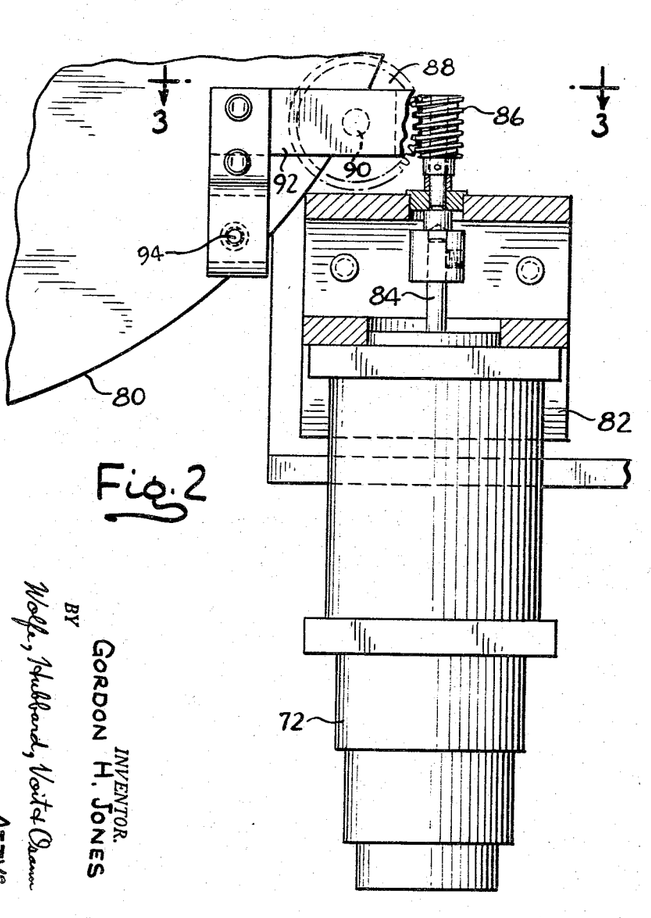
FIG. 2 is an enlarged fragmentary detail view of the scriber mechanism for recording lead screw error directly on a cam blank.
Figure 3:
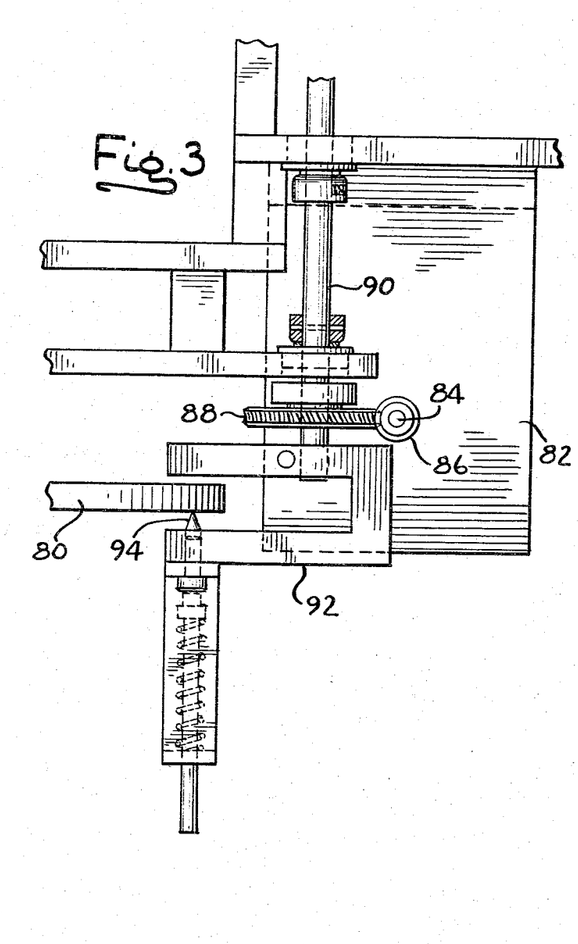
FIG. 3 is a fragmentary elevational view of the scriber mechanism taken substantially in the plane of lines 3—3 in FIG. 2.

As shown in FIG. 1, the record of the compensating motion may be expeditiously made by means of an apparatus which scribes a line in the face of a metal disc or cam blank 80 which is rotated through almost one revolution while the headstock is traversed its full travel across the rail, by gearing 81 connected to the lead screw. It is advisable to provide for rotation of the cam blank through less than a complete revolution for full headstock travel so as to avoid too sharp a step between the end and start of the cam track. Details of the scriber are found in FIGS. 2 and 3 which illustrate the correction servomotor 72 carried by a support 82 and driving the input shaft 34 to the differential 28 via gears 35, worm 86, and worm wheel 88. The servomotor output shaft 84, in the present case, rotates a control shaft 90 which is journalled on the bracket 82 and carries a C-shaped element 92 straddling the cam blank 80. The element 92 supports a sharp scribing or scoring tool 94 in engagement with the face of the cam blank 80 as the latter rotates to scribe a continuous generally circular outline thereon. Compensating motion of the differential input shaft 34 is typically rotation of the shaft several degrees in one direction or the other. The scribing tool 94 being carried offset from the control shaft 90 moves radially relative to the edge of the cam blank 80 according to the direction and extent of the angular motion of the control shaft and its instantaneous position represents the lead screw error at a certain point along the lead screw.

After the cam blank 80 has been rotated almost one revolution upon the headstock completing its travel, the blank is removed and machined to the scribed edge contour. It is now a cam representing the recurring lead screw errors. While cams have been used to compensate for lead screw errors, in the past producing such cams has involved painstaking incremental measurements over the full travel of the screw using precision gage means. These errors noted by such measuring were laid out on a cam blank, and the numerous points extrapolated by a scribed line to define the cam contour. The cam contour was then fashioned using hand or power tools. The process was time consuming and laborious since it involved taking a large number of individual measurements. The accuracy of the cam produced is inherently limited by this extrapolation process, and is obviously dependent on accurate manual measurements. As a result, lead screw error correction by cam means has been limited to experimental or special machines for the most part. In contrast, by following the method of this invention a cam is produced which is as highly accurate as the correction feedback system. Moreover, it is produced as an incident to operation of the machine tool utilizing precision scribing mechanism added to the control without undesirably affecting the normal operation of the control.

Figures 5, 6, 7, 8:
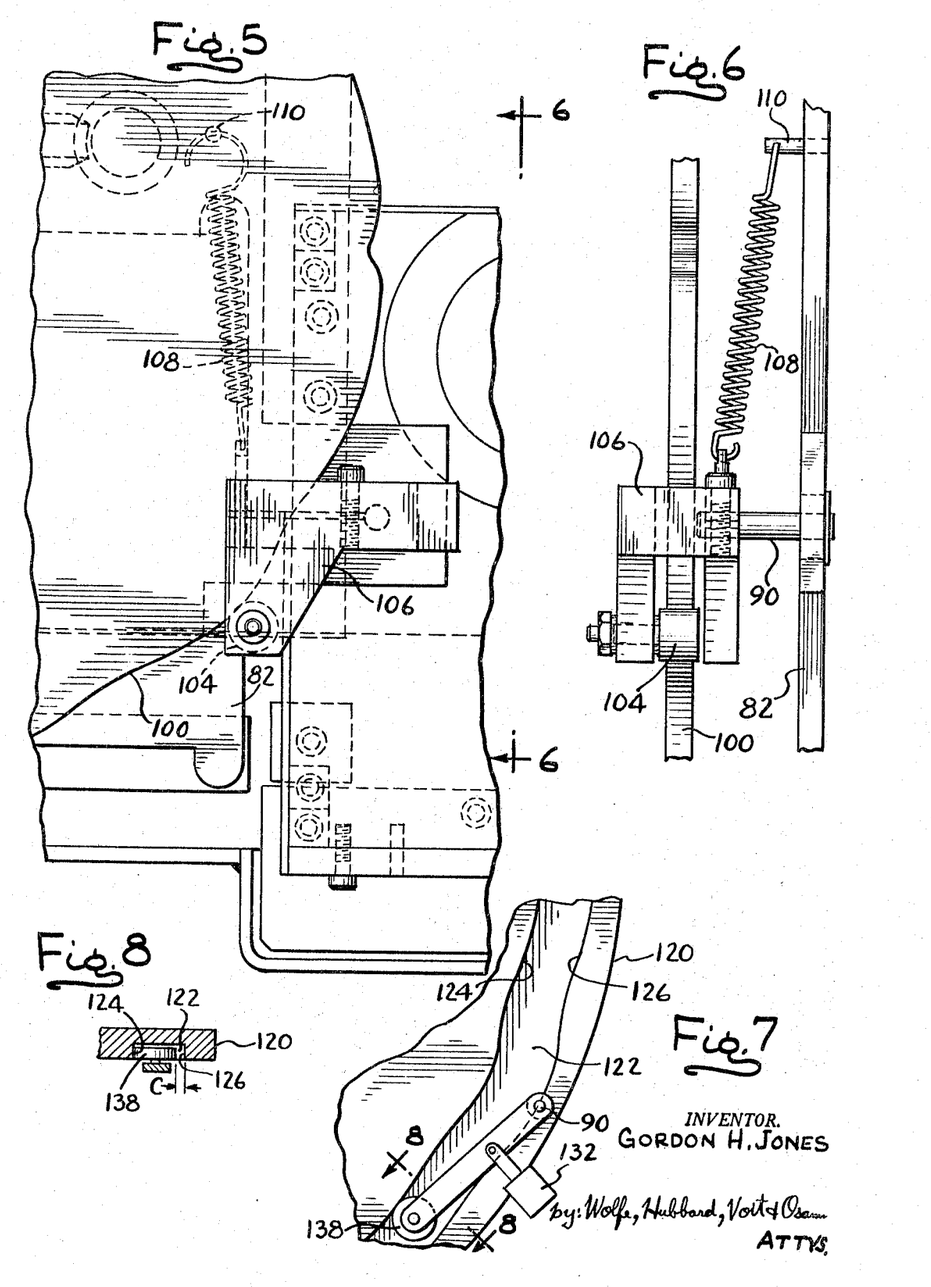
FIG. 5 is an enlarged fragmentary detail view of the FIG. 4 compensation cam and cam follower mechanism.
FIG. 6 is a fragmentary detail elevational view of the mechanism shown in FIG. 5 taken substantially in the plane of lines 6—6.
FIG. 7 is a fragmentary view of an alternative form of cam having a cam groove to provide compensation for drive reversal back-lash.
FIG. 8 is a sectional view through the cam groove.

Now turning to FIG. 4, to utilize the cam produced from the cam blank 80, the scriber apparatus 92, 94 which is illustrated in FIG. 1 is replaced by a cam follower mechanism. The cam 100 is mounted on the same drive shaft 102 used to rotate the cam blank 80 while it was scribed, the gear train 81 to that drive shaft 102 being constructed such that the cam 100 is rotated one revolution for the full headstock travel. To synchronize the cam 100 with the lead screw, it is located angularly as by means of a key or the like on the drive shaft 102 relatively the same as when the blank 80 was scribed. Referring now also to FIGS. 5 and 6, the scoring tool 94 is removed from the C-shaped supporting element 92 mounted upon the control shaft 90 and replaced by a cam follower roller 104. The axis of the roller is located offset from the point of the scribing tool 94 so as to account for the radius of the roller 104. With the roller 104 riding on the edge of the cam 100, the cam 100 causes the cam follower control shaft 90 to rotate so as to turn the differential input shaft 34 to introduce compensating motion via the differential 28 to the main feedback resolver drive.

To hold the roller 104 against the cam edge, a spring 108 is connected between the carriage 106 and a conveniently located stud 110 on the support bracket 82. It will be seen that upon rotation of the cam 100 responsive to rotation of the lead screw to position the headstock, the variable cam edge contour will swivel the roller support element 92 to angularly adjust the control shaft 90. Since the cam 100 and headstock are driven in synchronism and the cam edge represents the lead screw error throughout the entire travel of the headstock, the requisite compensating motion will be introduced through the differential 28 for all positions of the headstock along the rail.

While the system of FIG. 4 has been found to provide high positioning accuracy by compensating for recurring lead screw errors, a further form of the invention, shown in FIG. 7, contemplates also compensating for back-lash upon reversal of the headstock feed drive. Compensation for such back-lash may be efficiently introduced over the entire travel of the headstock by adding in effect, an increment of compensation for such back-lash error. A preferred cam mechanism construction that serves this purpose is shown fragmentarily in FIGS. 7 and 8. The cam 120 of this mechanism is formed with a groove 122 around its face in which the inner and outer circumferential edges 124 and 126 are independently formed to represent the requisite compensation in both directions of headstock travel.

The cam is produced following generally the same method as described hereinbefore for the cam blank 80. To that end, the edge 124 is scribed in the same manner as was cam 100 to represent compensation required for headstock travel in a first direction. Then with the headstock positioned to the limit of its initial direction of travel, the scribing tool is offset an amount equal to the diameter of a cam follower 128. With the scriber tool so set, the headstock is reversed and traversed in the second direction to the other limit of its travel. The two scribed lines form the outline of groove 122 on cam blank 120. This groove is then machined to a suitable depth.

The cam follower roller 128 held in contact by a pivotal arm 130 with the inner edge 124 of the cam groove 122 during travel of the headstock in one direction along the rail, operates through essentially the same mechanism shown in FIGS. 5 and 6 to introduce compensating motion into the main resolver drive. Thus, the pivotal arm 130 may be fixed to the control shaft 90. Upon reversal of direction of motion of the headstock along the rail, a solenoid 132 is energized to move the cam follower roller into contact with the outer edge 126 of the cam groove. In this case, the clearance "C" defines the increment of cam follower displacement introduced to compensate for back-lash upon reversal.

It has been observed that back-lash error is not constant over the full travel of the headstock. Moreover, drive errors are not identical for both directions of travel. Longitudinal deflection of the feed screw is apparently greatest when the headstock is furthest from the bearings supporting the lead screw, i.e. when the headstock is midway in its travel, and the error resulting from lead screw deflection is minus for one direction of travel of the headstock and positive for the other direction of travel. The slot 122 in the cam 120 will, therefore, widen out toward its mid-point reflecting that the required compensation is not identical for both directions of headstock movement.

I claim as my invention:

1. The method of producing a compensating cam for compensating a servo positioning system having a feed screw for lead errors in said screw, which comprises the steps of: operating the screw by a drive to feed a member along the screw, continuously generating feedback signals representing the position of said member by the angular position of said screw at the end connected to the drive using transducer means connected to said screw and utilizing said feedback signals in the operation of said screw, generating error signals while feeding said member representing the differential displacement errors for successive positions of said member between the actual member position and that indicated by the feedback signals produced by said transducer means and utilizing said error signals for compensating the operation of said screw for said displacement errors, scribing a cam blank according to said displacement error signals while said error signals are being generated, and fashioning said cam blank to said scribed signals.

2. The method of producing a compensating cam for compensating a servo positioning system having a feed screw for lead errors in said screw, which comprises the steps of: operating the screw by a drive to feed a member along the screw, continuously generating feedback signals representing the position of said member by the angular position of said screw at the end connected to the drive using transducer means connected to said screw and utilizing said feedback signals in the operation of said screw, generating error signals while feeding said member representing the differential displacement errors for successive positions of said member between the actual member position and that indicated by the feedback signals produced by said transducer means and utilizing said error signals for compensating the operation of said screw for said displacement errors, recording said error signals, while said error signals are being generated, and fashioning a cam according to said recording.

3. In a servo positioning system having a feed screw, a member movable along a path of travel by said screw, and servomotor means for driving said screw, the combination comprising, a transducer for generating feedback signals representing the indicated position of said member along said path of travel by the position of said screw at the end most closely coupled to said servomotor means, means for generating error signals representing the differential between said transducer indicated position and the actual position of said member, means applying said error signals to said transducer so as to provide compensated feedback signals accounting for said differential, means for conveying said compensated feedback signals to said servomotor means, said servomotor means being adapted to respond to positioning signals from a source and said compensated feedback signals to position said member along said path of travel, and means for recording continuous error signals produced by said generating means as an incident to continuous feeding of said member throughout its path of travel by said servomotor while it is operated by said positioning and compensated feedback signals.

4. In a servo positioning system having a feed screw, a member movable along a path of travel by said screw, and servomotor means for driving said screw, the combination comprising, a transducer for generating feedback signals representing the indicated position of said member along said path of travel by the position of said screw at the end driven by said servomotor means, means for generating error signals representing the differential between said transducer indicated position and the actual position of said member, means applying said error signals to said transducer so as to provide compensated feedback signals accounting for said differential, means for conveying said compensated feedback signals to said servomotor means, said servomotor means being adapted to respond to positioning signals from a source and said compensated feedback signals to position said member along said path of travel, and means for recording a cam outline according to continuous error signals produced by said generating means as an incident to continuous feeding of said member throughout its path of travel by said servomotor means while it is operated by said positioning and compensated feedback signals.

5. In a servo positioning system having a feed screw, a member movable along a path of travel by said screw, and servomotor means for driving said screw, the combination comprising, a transducer for generating feedback signals representing the indicated position of said member along said path of travel by the position of said screw at the end driven by said servomotor means, means for generating error signals representing the differential between said transducer indicated position and the actual position of said member, means applying said error signals to said transducer so as to provide compensated feedback signals accounting for said differential, means for conveying said compensated feedback signals to said servomotor means, said servomotor means being adapted to respond to positioning signals from a source and said compensated feedback signals to position said member along said path of travel, and means for scribing a cam blank according to continuous error signals produced by said generating means as an incident to continuous feeding of said member throughout its path of travel by said servomotor means while it is operated by said positioning and compensated feedback signals.

6. In a servo positioning system having a feed means, a member movable along a path of travel by said feed means, and servomotor means for driving said feed means, the combination comprising, a transducer for generating feedback signals representing the indicated position of said member along said path of travel according to the end of said feed means driven by paid servomotor means, means for generating error signals representing the differential between said transducer indicated position and the actual position of said member, means for applying said error signals to said transducer so as to provide compensated feedback signals accounting for said differential, means for conveying said compensated feedback signals to said servomotor means, said servomotor means being adapted to respond to positioning signals from a source and said compensated feedback signals to position said member along said path of travel, and means for recording a cam outline according to continuous error signals produced by said generating means as an incident to continuous feeding of said member throughout its path of travel by said servomotor means while it is operated by said positioning and compensated feedback signals.

7. In a servo positioning system having a feed means, a member movable along a path of travel by said feed means, and servomotor means for driving said feed means, the combination comprising, a transducer for generating feedback signals representing the indicated position of said member along said path of travel according to said feed means, means for generating error signals representing the differential between said transducer indicated position and the actual position of said member, means applying said error signals to said transducer so as to provide compensated feedback signals accounting for said differential, means for conveying said compensated feedback signals to said servomotor means, said servomotor means being adapted to respond to positioning signals from a source and said compensated feedback signals to position said member along said path of travel, means for recording continuous error signals produced by said generating means as an incident to continuous feed of said member in one direction throughout its path of travel, and means for recording error signals produced by said generating means as an incident to reversal of said feed means to return said member, said last-named error signals after feed reversal upon comparison with error signals recorded before feed reversal providing a representation of back-lash errors in said feed means.

8. In a servo system for positioning a movable member along a path responsive to continuously supplied command signals and feedback signals representing the position of said member, said system including a servomotor, feed means coupling said servomotor to said member, a feedback transducer driven from said feed means so as to provide feedback signals according to the indicated position of said member, and means for combining said command and feedback signals and for providing a control signal to said servomotor driving said servomotor in a direction tending to eliminate said feedback signal, the combination comprising, a cam having one cam surface representing the differential between the indicated position of said member according to said feed means and the actual position of said member for all positions of said member upon movement in one direction throughout said path, said cam having a second cam surface representing said differential upon return movement of said member and spaced from said one cam surface to represent back-lash upon return movement of said feed means, means for driving said cam in synchronism with said feed means, and means operated by said cam including a cam follower selectively movable into engagement with said one or said second cam surface according to the direction of movement of said member for introducing compensating motion into said connection to said transducer so as to compensate said transducer to account for said differential upon either direction of movement of said member and for back-lash upon feed means reversal.

9. In a positioning system having a feed screw, a member movable along a path of travel by said screw, and means for driving said screw, the combination comprising, a transducer for generating feedback signals representing the indicated position of said member along said path of travel by the position of said screw at its driven end, means for generating error signals representing the differential between said transducer indicated position and the actual position of said member, means for applying said error signals to said transducer so as to provide compensated feedback signals accounting for said differential, means for conveying said compensated feedback signals to said driving means, said driving means being adapted to respond to positioning signals from a source and said compensated feedback signals to position said member along said path of travel, means for recording continuous error signals produced by said generating means as an incident to continuous feeding of said member throughout its path of travel by said driving means while it is operated by said positioning and compensated feedback signals, and means for recording error signals produced by said generating means as an incident to reversal of said feed means to return said member, said last-named error signal after feed reversal upon comparison with error signals recorded before feed reversal providing a representation of backlash errors in said feed screw.

10. In a servo system for positioning a movable member to positions throughout a length of travel responsive to command signals and feedback signals representing the position of said member, said system including drive means, feed means coupling said drive means to said member, a feedback transducer driven from said feed means so as to provide feedback signals according to the indicated position of said member, and means for combining said command and feedback signals and for providing a control signal to said drive means for driving said feed means in a direction tending to eliminate said feedback signal, the combination comprising, a cam having one cam surface representing the differential between the indicated position of said member according to said feed means and the actual position of said member for all positions of said member upon movement in one direction throughout said length of travel, said cam having a second cam surface representing said differential upon return movement of said member and spaced from said one cam surface to represent back-lash upon reversal of said feed means, means for driving said cam in synchronism with said feed means, and means operated by said cam including a cam follower selectively movable into engagement with said one or said second cam surface according to the direction of movement of said member for introducing compensating motion into said connection to said transducer so as to compensate said transducer to account for said differential upon either direction of movement of said member and for back-lash upon feed means reversal.

11. In a positioning system having a feed screw, a member movable by said screw, and means for driving said screw, the combination comprising, a transducer for generating feedback signals representing the indicated position of said member according to the position of said screw at its driven end, means for generating error signals representing the differential between said transducer indicated position and the actual position of said member, means for applying said error signals to said transducer so as to provide compensated feedback signals accounting for said differential, means for conveying said compensated feedback signals to said driving means, said driving means being adapted to respond to positioning signals from a source and said compensated feedback signals to position said member by driving said screw, and means for recording a cam outline according to error signals produced by said generating means as an incident to feeding of said member to successive positions by said driving means while it is operated by said positioning and compensated feedback signals.

12. The method of compensating a servo positioning system having a feedscrew for lead errors in said screw, which comprises the steps of:
 (a) operating the screw by a drive to feed a member along the screw,
 (b) continually generating feedback signals representing the position of said member by the angular position of said screw at the end connected to said drive using transducer means connected to said screw and utilizing said feedback signals in the operation of said screw,
 (c) producing a compensating cam by the steps of
  (1) continually generating error signals while feeding said member representing the displacement errors between the actual member position and that indicated by the feedback signals produced by said transducer means and utilizing said error signals for compensating the operation of said screw for said displacement errors, and
  (2) fashioning a cam according to said displacement error signals, and
 (d) modifying the feedback signals produced by said transducer means in accordance with the compensating cam to compensate for said displacement errors.

13. In a control system for positioning a movable element along a path responsive to a continuously supplied command signal, including a main servomotor, a feed drive coupling said main servomotor to said element, means for providing a feedback signal including a feedback transducer connected to said feed drive screw at a point closely coupled to said main servomotor and excluding the following portion of said feed drive from the feedback loop which includes said transducer and said servomotor, and means for combining said command and feedback signals so as to provide a control signal applied to said servomotor driving said servomotor in a direction tending to eliminate said feedback signal, the method of compensating said control system for positioning errors of the drive comprising the steps of
 (a) generating continuous error signals while said drive positions said element throughout said path, said error signals representing the displacement errors in said drive,
 (b) feeding said error signals to a correction servomotor means so that the latter is responsive to said error signals,
 (c) connecting the output of said correction servomotor means to introduce compensating motion produced in response to said error signals into the connection between said servomotor and said feedback transducer so that the latter provides compensated feedback signals accounting for said differential errors,
 (d) forming a cam in response to said continuous error signals to represent the displacement errors in said drive at all positions of said element in one direction of its movement along said path, and
 (e) replacing said error signal generating means and said correction servomotor means by a cam mechanism adapted to receive said cam and operable to produce compensating motion representing said displacement errors in said drive, said cam mechanism being operable to introduce said motion into the connection to said feedback transducer to compensate the latter for said lead errors.

14. In a control system for positioning a movable element along a path in a first and in a return direction in response to continuously supplied command signals, including a main servomotor, a feed drive coupling said main servomotor to said element, means for providing a feedback signal at a point closely coupled to said main servomotor and excluding the following portion of said feed drive from the feedback loop which includes said transducer and said servomotor, and means for combining said command and feedback signals so as to provide a control signal applied to said servomotor driving it in a direction tending to eliminate said feedback signal, the method of compensating said system for positioning errors of the drive comprising the steps of (a) generating continuous error signals while said drive positions said element throughout said path in said first direction, said error signals representing displacement errors in said drive, and simultaneously
  (1) applying said error signals to a correction servomotor means to drive it in response to said error signals,
  (2) introducing, by means of the servomotor output, a compensating motion produced in response to said error signals into the connection between said servomotor means and said feedback transducer to cause it to provide feedback signals which are compensated for said differential displacement error, and
  (3) forming a first cam surface on a cam in response to said continuous error signals to represent the displacement error in said drive at all positions of said element in said first direction,
(b) generating continuous return error signals while said drive positions said element throughout said path in said return direction, said return error signals representing displacement errors in said drive while operating in said return direction, and simultaneously
  (1) applying said return error signals to said correction servomotor means to drive it in response to said return error signals,
  (2) introducing, through said servomotor output, a compensating motion produced in response to said return error signals into said connection between said servomotor means and said transducer to cause the latter to provide feedback signals which are compensated for said differential displacement error in the return direction, and
  (3) forming a second cam surface on said cam in response to said continuous return error signals to represent the displacement in said drive at all postions of said element in said return direction, said first and second cam surfaces being spaced from one another by an amount representative of backlash upon reversal of said feed drive, and
(c) replacing said error signal generating means and said correction servomotor means by a cam mechanism adapted to receive said cam and operable to produce compensating motion representing said displacement errors in said drive in both of said directions, said cam mechanism being operable to introduce said motion into the connection to said feedback transducer to compensate the latter for said displacement errors.

References Cited

UNITED STATES PATENTS 2,937,325  5/1960  Garber ______________ 318—28
3,039,032  6/1962  Fowler ______________ 318—30

BENJAMIN DOBECK, *Primary Examiner.*